June 27, 1950   A. R. CUNNINGHAM   2,513,006
WATERING TROUGH FOR LIVESTOCK
Filed March 11, 1947   2 Sheets-Sheet 2
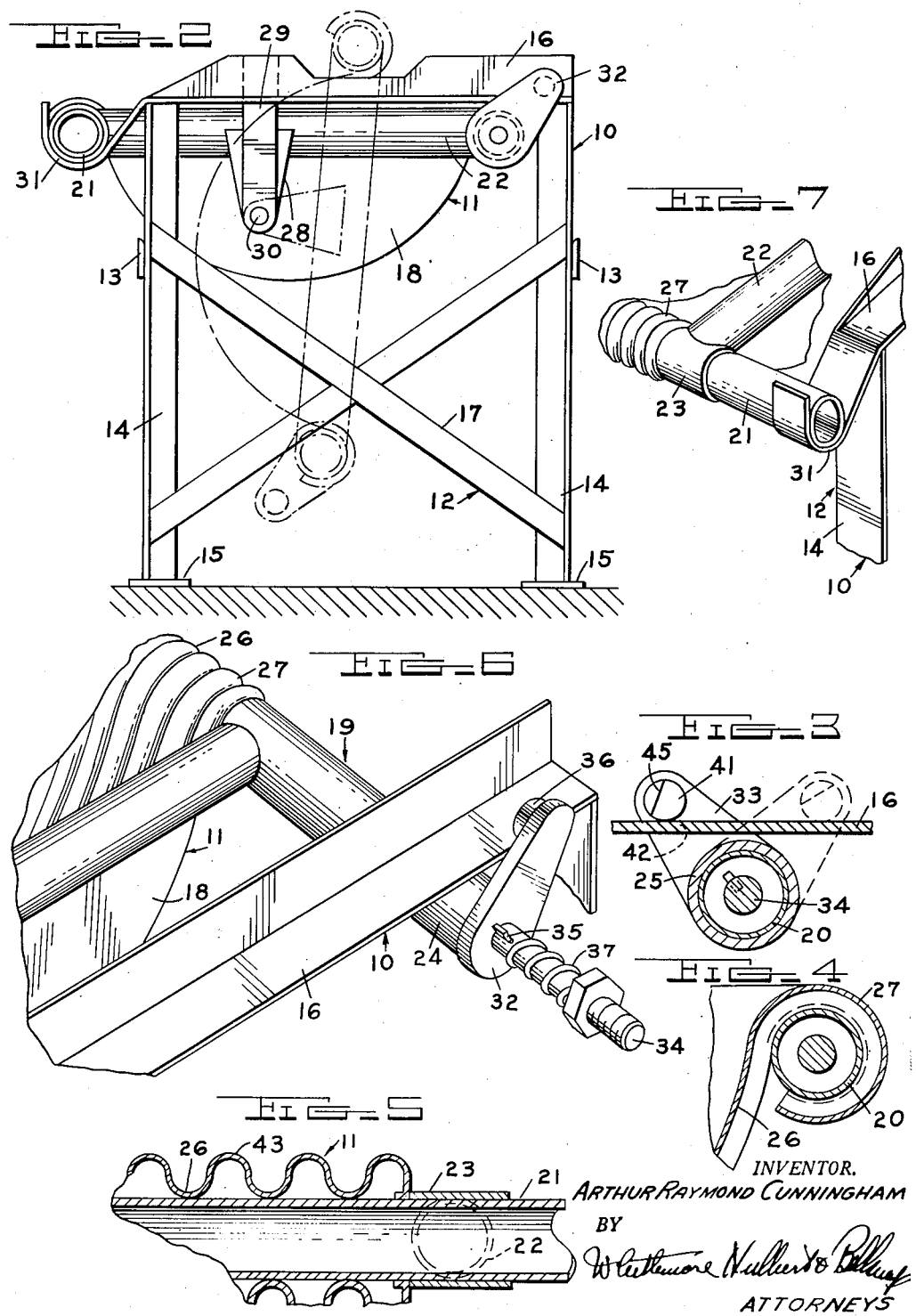
INVENTOR.
ARTHUR RAYMOND CUNNINGHAM
BY
ATTORNEYS Patented June 27, 1950

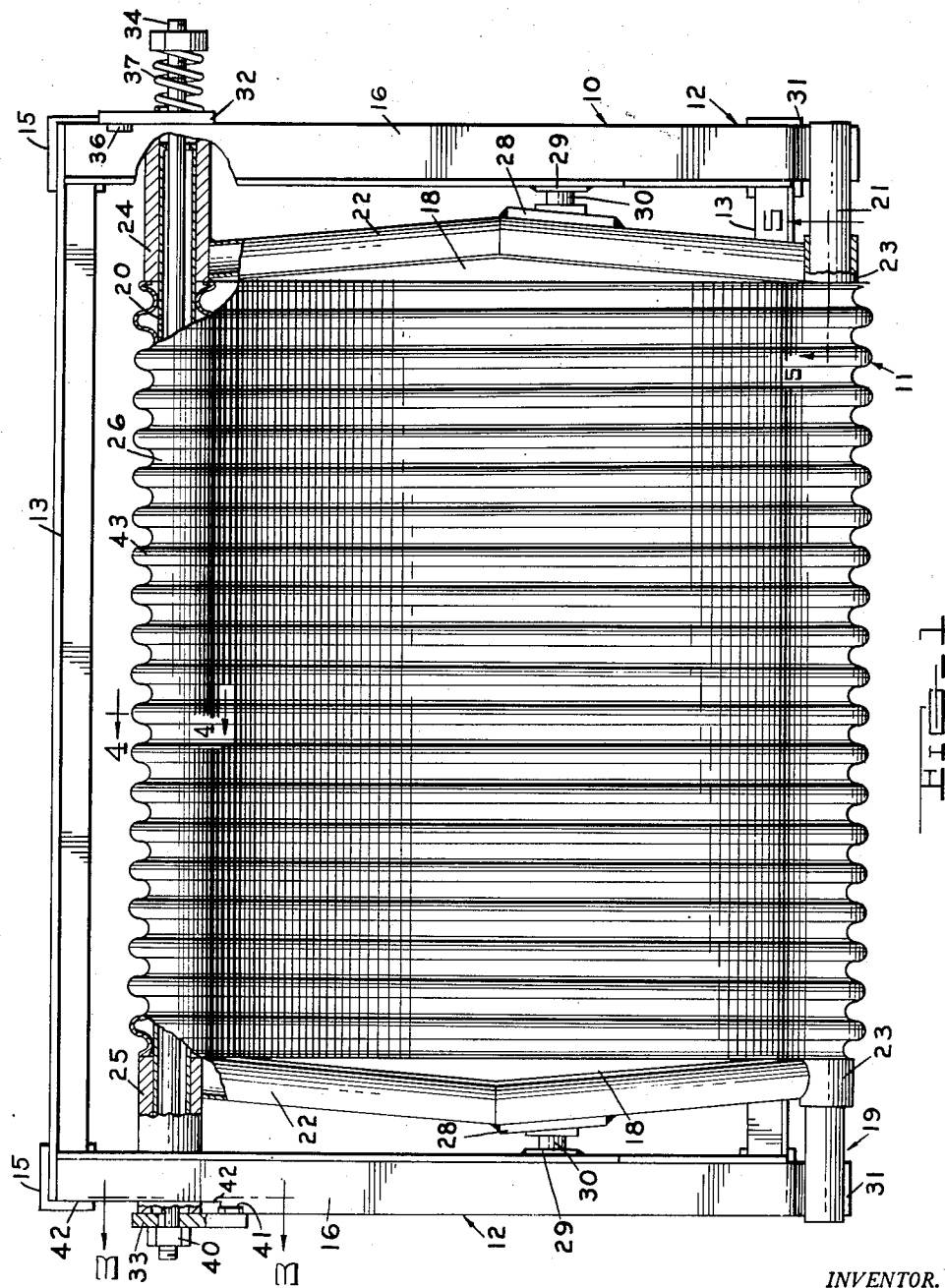

2,513,006

UNITED STATES PATENT OFFICE 2,513,006

WATERING TROUGH FOR LIVESTOCK

Arthur Raymond Cunningham, Detroit, Mich.

Application March 11, 1947, Serial No. 733,904

7 Claims. (Cl. 119—61)

This invention relates generally to watering containers and refers more particularly to improvements in the types of troughs ordinarily used in rural localities to water livestock.

It is customary in rural districts or in any locality where livestock is kept to provide troughs or tanks containing a supply of water. In regions subject to temperatures below the freezing point of water, it is of course, necessary to remove the ice formed in the tank prior to watering the stock. This chore not only requires considerable time and effort, but is extremely hard on the tanks or troughs, especially in cases where the latter are formed of sheet metal. The implements used to break the ice preparatory to removing the latter frequently pierce the tank or trough and necessitate replacement of the latter at considerable expense. With the above in view, it is one of the objects of this invention to provide a container or trough which will swing automatically to a tipped position in response to expansion of the volume of water therein resulting from freezing of the water. The shape of the trough is such that when the latter is tipped from its normal upright position, the frozen water or block of ice readily falls out of the trough.

Another feature of this invention is to provide a trough pivoted adjacent one edge portion to a standard in such a manner that the axis of swinging movement of the trough is located below the center of gravity of the trough so that the weight of the water tends to swing the trough to a tipped position.

A further object of this invention is to provide a trough constructed to elongate in response to the expansion of the volume of water therein resulting from freezing of the water, and normally held in its upright position relative to the standard by latch means releasable in response to elongation of the trough.

The foregoing as well as other objects will be made more apparent as this description proceeds, especially when considered in connection with the accompanying drawings, wherein:

Figure 1 is a plan view partly in section of a watering trough assembly embodying the features of this invention;

Figure 2 is an end elevational view of the assembly shown.

Figures 3, 4 and 5 are respectively sectional views taken on the planes indicated by the lines 3—3, 4—4 and 5—5 of Figure 1;

Figure 6 is an enlarged fragmentary perspective view of a part of the assembly shown in Figure 1; and Figure 7 is a fragmentary perspective view of a U-shaped retainer supporting a tubular frame member.

The several figures of the drawings illustrate a watering trough assembly comprising a standard 10 and a container or trough 11 adapted to hold a quantity of water. The standard 10 comprises end sections 12 secured in spaced relation to each other by longitudinally extending frame members 13. Each end section 12 comprises laterally spaced vertically extending angle members 14 having support engaging plates 15 at the lower ends and having the upper ends connected by a cross member 16. The vertical members 14 of each end section 12 are braced by a substantially X-shaped frame section 17 having the opposite ends welded or otherwise permanently secured to the upright frame members.

The trough or container 11 is arcuate in cross section and the end walls 18 are tapered outwardly from the bottom of the trough in the manner indicated in Figure 1 of the drawings. The marginal edge portions of the trough or container are reinforced by a tubular frame 19 having longitudinally extending tubular members 20 and 21 at opposite sides of the trough and secured together in lateral spaced relationship by transverse tubular members 22. The tubular members 22 respectively extend along opposite ends of the trough and are welded or otherwise permanently secured to the top edges of the end walls 18. The ends of the tubular members 22 adjacent the tubular member 21 are secured to tubular coupling 23 adapted to be sleeved on the tubular member 21. The opposite ends of the tubular members 22 adjacent the tubular member 20 are welded or otherwise respectively secured to a pair of sleeves 24 and 25. The sleeves 24 and 25 are respectively sleeved on opposite ends of the tubular member 20 in the manner clearly shown in Figure 1 of the drawings.

In the present instance the bottom and side walls of the trough or container 11 are formed from a single piece of sheet metal 26 arcuate in cross section and having the opposite ends welded, brazed or otherwise secured to the end walls 18. The opposite longitudinal edge portions of the arcuate sheet metal section 26 are respectively looped around the tubular frame members 20 and 21 in the manner indicated by the numeral 27 in Figure 4 of the drawings.

The trough or container 11 is pivotally supported on the standard 10 for swinging movement about a horizontal axis located adjacent to the tubular member 21 and positioned below the center of gravity of the container so that the latter is normally urged from its full line position shown in Figure 2 of the drawings to the broken line position shown in the same figure. In detail a pair of plates 28 are respectively welded or otherwise permanently secured to the end frame members 22 between the longitudinal centerline of the trough or container 11 and the tubular frame member 21. Upon reference to Figure 2 of the drawings, it will be noted that the plates 28 extend downwardly from the end frame members 22 to a point adjacent the bottom of the trough or container and are pivoted to the lower ends of suitable straps 29 by pins 30. The upper ends of the straps 29 are respectively fixed to the top frame bars 16 of the end sections 12 on the standard 10. The two pins 30 are axially aligned and are located so that the trough or container 11 is normally urged to its tipped position shown by the broken line in Figure 2 of the drawings.

Referring now to Figure 7 of the drawings, it will be noted that the opposite ends of the tubular frame member 21 extend beyond the corresponding ends of the trough or container 11 and are adapted to rest in U-shaped retainers 31 carried by the adjacent ends of the frame bars 16. The retainers 31 act as stops to locate the trough in its upright position and permit unobstructed swinging movement of the trough or container 11 to its tipped position shown by the broken lines in Figure 2.

The container or trough 11 is normally held in its upright position by releasable latch means comprising a pair of dogs 32 and 33 respectively positioned at opposite ends of the tubular frame member 20. In detail a shaft 34 extends axially through the tubular member 20 and projects beyond opposite ends of the latter. The dog 32 is slidably but non-rotatably secured to the shaft 34 adjacent the outer end of the sleeve 24 by a key 35, and the free end of the dog is provided with a button 36 at the inner side thereof for engagement with the top surface of the adjacent frame member 16 in the manner clearly shown in Figure 6 of the drawings. A coil spring 37 is supported on the shaft 34 outwardly beyond the dog 32, between the latter and nut 39 threaded on the adjacent end of the shaft 34. The spring 37 acts to hold the dog 32 in a position with the button 36 contacting the adjacent frame member 16.

The dog 33 is keyed to the opposite end of the shaft 34 beyond the adjacent end of the sleeve 25, and is clamped to the sleeve 25 by a nut 40 threaded on the adjacent end of the shaft 34. The free end of the dog 33 is formed with a button 41 on the inner surface thereof adapted to rest on the top face of the adjacent frame member 16. Upon reference to Figure 1 of the drawings, it will be noted that the dog 32 extends outwardly from the shaft 33, and that the button 36 at the swinging end of the dog engages the adjacent frame member 16 outwardly beyond the shaft 34. The dog 33 extends inwardly from the shaft 34, and the button 41 on the swinging end thereof engages the adjacent frame member 16 at a point spaced inwardly from the shaft. It will further be noted from Figure 1 of the drawings that the edge of the frame member 16 adjacent the dog 33 is cut away to form a slot 42 of sufficient dimension to provide clearance for the button 41. However, the length of the slot is predetermined so that when the dog 33 is in its latched position, the button 41 has a bearing engagement with the frame member 16. It follows from the foregoing that the latching dogs are relatively positioned to enable swinging movement of the dog 32 downwardly and the dog 33 upwardly. However, under normal conditions, the spring is prevented from swinging the dogs by engagement of the button 36 on the dog 32 with the adjacent frame member 16.

The latching dog 32 is released from engagement with the adjacent frame member 16 or standard in response to elongation of the trough or container 11. In order to permit elongation of the trough or container 11, the sheet metal section 26 is corrugated to form a multiplicity of corrugations 43 extending from one longitudinal edge of the trough to the opposite longitudinal edge portion. Assuming now that the trough is filled with water and that the water freezes, the resulting expansion of the volume of water in the trough elongates the trough. As the length of the trough is increased, the end walls 18 are, of course, moved outwardly, and since the sleeves 24 and 25 are carried by the end walls, it follows that these sleeves are correspondingly moved relative to the frame member 20. Outward displacement of the sleeve 24 imparts a movement to the latching dog 32 against the action of the spring 37 and disengages the button 36 from the adjacent frame member 16. Thus the dog 32 is free to swing in a downward direction under the influence of the weight of the trough, and the free end of the dog 33 is thereby swung upwardly to release the button 41 from engagement with the adjacent frame member 16. As a result the adjacent longitudinal edge portion of the trough is released from the standard, and the weight of the contents of the trough enables the same to swing to its tipped position by the force of gravity. When in this tipped position, the contents of the trough or container drop out of the latter by the action of gravity, and the container may be returned to its upright position. The container is latched in its upright position by swinging the latching dog 32 upwardly and outwardly to enable the button 36 to pass the adjacent frame member 16. The dog 32 is then released to permit the spring 37 to return the dog to a position wherein the button engages the top surface of the adjacent frame member 16. It will, of course, be understood that as the dog 32 is manipulated to return the same to its latched position, the button 41 on the dog 33 moves upwardly through the slot 42 and is returned into engagement with the top surface of the adjacent frame member 16 at a point spaced inwardly from the slot. In this connection it will be noted that clearance is provided to enable movement of the button 41 through the slot 42 by forming a flat 45 on one side of the button 41.

It follows from the foregoing that I have provided a relatively simple and inexpensive watering trough which will automatically swing to a tilted position in response to elongation of the trough occasioned by freezing the water in the trough. It will further be noted that the trough is of such construction that the ice is dropped by the action of gravity when the trough is swung to its tilted position.

What I claim as my invention is:

1. A tank for use in watering livestock, comprising a standard, a trough arcuate in cross section and having transverse corrugations permitting elongation of the trough in response to expansion of the water therein, means pivotally supporting the trough on the standard permitting swinging movement of the trough to a tipped position relative to the standard, cooperating engaging latch means carried by the standard and trough for normally holding the trough in an upright position on the standard, and means operable upon elongation of the trough to release the latch means and permit swinging movement of the trough to its tipped position.

2. A tank for use in watering livestock, comprising a standard, an elongated trough having transverse corrugations permitting elongation of the trough in response to expansion of the water therein, means pivotally connecting the trough adjacent one longitudinal edge and below the center of gravity thereof to the standard whereby the trough is normally urged by the action of gravity to a tipped position relative to the standard, and latch means at the longitudinal edge portion of the trough opposite the longitudinal edge aforesaid of the trough cooperating with adjacent parts of the standard to hold the trough in its upright position and releasable from the standard in response to elongation of the trough.

3. A tank for use in watering livestock, comprising a standard, an elongated trough having transverse corrugations permitting elongation of the trough in response to expansion of the water therein and having outwardly tapered end walls, means pivotally connecting the trough adjacent one longitudinal edge and below the center of gravity thereof to the standard whereby the trough is normally urged by the action of gravity to a tipped position relative to the standard, and latch elements at opposite ends of the trough adjacent the longitudinal edge of the trough opposite the edge aforesaid thereof for engagement with adjacent parts of the standard to hold the trough in an upright position and releasable from the standard in response to elongation of the trough.

4. A tank for use in watering livestock, comprising a standard, a container for water adapted to elongate in response to expansion of the volume of water therein and normally supported in an upright position on the standard, means pivotally connecting the container adjacent one edge thereof and below the center of gravity of the same to the standard whereby the container is normally urged by the action of gravity to a tipped position, and latch elements carried by the container at opposite ends of the edge of the container opposite the edge aforesaid for engagement with adjacent parts of the standard to hold the container in an upright position and releasable from the standard in response to elongation of the container.

5. A tank for use in watering livestock, comprising a standard, a container for water adapted to elongate in response to expansion of the volume of water therein and normally supported in an upright position on the standard, means pivotally connecting the container adjacent one edge thereof and below the center of gravity of the same to the standard whereby the container is normally urged by the action of gravity to a tipped position, latching dogs respectively pivotally supported on the container at opposite ends of the edge of the container opposite the edge aforesaid thereof and having means at the swinging ends thereof engageable with adjacent parts of the standard to hold the container in an upright position, said means being releasable from the standard in response to elongation of the container.

6. A tank for use in watering livestock, comprising a standard, an elongated trough having transverse corrugations permitting elongation of the trough in response to expansion of the water therein and having outwardly tapered end walls, means pivotally connecting the trough adjacent one longitudinal edge and below the center of gravity thereof to the standard whereby the trough is normally urged by the action of gravity to a tipped position relative to the standard, latching dogs respectively pivotally supported on the trough at opposite ends of the longitudinal edge of the trough opposite the edge aforesaid and having means at the swinging ends thereof engageable with adjacent parts of the standard to hold the container in an upright position, said means being releasable from the standard in response to elongation of the container, and means operatively connecting the latching dogs.

7. A tank for use in watering livestock, comprising a standard, a container for water supported on the standard in an upright position and adapted to elongate under certain conditions, means pivotally connecting the container below the center of gravity to the standard whereby the container is normally urged by the action of gravity to a tipped position, cooperating engaging latch means carried by the standard and container for holding the container in its upright position, and means operable upon elongation of the container to release said latch means and permit movement of the container to its tipped position.

ARTHUR RAYMOND CUNNINGHAM.

REFERENCES CITED

The following references are of record in the file of this patent:

UNITED STATES PATENTS

| Number | Name | Date |
|---|---|---|
| 689,735 | Mehan | Dec. 24, 1901 |
| 1,594,290 | Woessner et al. | July 27, 1926 |
| 1,666,791 | Rassmann | Apr. 17, 1928 |